United States Patent Office 3,582,270
Patented June 1, 1971

3,582,270
PROCESS FOR THE RECOVERY OF OSMIUM TETROXIDE
James Harkema, Kalamazoo, Mich., assignor to The Upjohn Company, Kalamazoo, Mich.
No Drawing. Filed May 23, 1968, Ser. No. 731,609
Int. Cl. C01g 55/00
U.S. Cl. 23—140
9 Claims

ABSTRACT OF THE DISCLOSURE

A process for the recovery of osmium tetroxide from a reaction mixture resulting from the oxygenation of a $\Delta^{17\,(20)}$-21-acyloxy steroid in an organic solvent with osmium tetroxide and an oxidizing agent to obtain the corresponding 17-hydroxy-20-keto-21-acyloxy steroid, which comprises treating said reaction mixture with thiourea under aqueous acidic conditions to produce an osmium thiourea complex; separating the osmium thiourea complex thus obtained from the reaction mixture in an aqueous phase and oxidizing the osmium thiourea complex with hydrogen peroxide to obtain osmium tetroxide which is recovered from the aqueous phase in accordance with methods known in the art, such as by extraction with water immiscible organic solvent or by distillation.

BACKGROUND OF THE INVENTION

Osmium tetroxide is an important reactant in the synthetic manufacture of many important steroids such as cortisone, hydrocortisone, prednisone, prednisolone, 6α-methylprednisolone, 16-methylhydrocortisone, 6α-fluoro-prednisolone, acylates thereof, and the like.

Osmium tetroxide is utilized together with an oxidizing agent for the purpose of producing 17α-hydroxy-20-keto-21 - acyloxy steroids, such as those mentioned above, directly from the corresponding $\Delta^{17\,(20)}$-21-acyloxy steroids. The oxygenation of steroids having an unsaturated 17,20-side chain with osmium tetroxide and an oxidizing agent is well known in the art. Prins and Reichstein, Helv. Chim. Acta 25, 300 (1942) report oxygenation using osmium tetroxide and chloric acid, Miescher and Schmidlin, Helv. Chim. Acta 33, 1840 (1950) use hydrogen peroxide as the oxidizing agent; U.S. Pat. No. 2,668,816 discloses the use of alkyl peroxides and peracids as oxidizing agents; U.S. Pat. No. 2,875,217 discloses organic polyvalent iodo oxides as oxidizing agents; U.S. Pat. No. 2,769,823 discloses amine oxide peroxides as oxidizing agents and U.S. Pat. 2,769,825 discloses an improved process using hydrogen peroxide as the oxidizing agent in the presence of an aromatic tertiary-N-heterocyclic amine.

In view of the high cost and relative scarcity of osmium, it is of extreme importance in the synthesis of important cortical steroids, such as those hereinbefore mentioned, that the osmium be recovered in the form of osmium tetroxide satisfactory for reuse in subsequent reactions. It is also important because of the toxicity of osmium to provide a method for removing substantially all of the osmium from the steroid reaction mixture prior to purification of the desired steroid product.

SUMMARY OF THE INVENTION

In the process for converting $\Delta^{17,\,20}$-21-acyloxy steroids to the corresponding 17α - hydroxy-20-keto-21-acyloxy steroids using osmium tetroxide and an oxidizing agent, it has now been discovered that the osmium can be recovered from the steroid reaction mixture in reusable form and in nearly quantitative yields (90–100%), by treating the reaction mixture with thiourea under aqueous acidic conditions to form a water soluble thiourea complex which is separated from the reaction mixture as an aqueous solution. The osmium thiourea complex contained therein is then oxidized with hydrogen peroxide to osmium tetroxide which is recovered in reusable form in accordance with methods known in the art, for example by extraction with a water immiscible organic solvent or by distillation. The recovery process of this invention provides nearly quantitative recovery of expensive and valuable osmium tetroxide in a form suitable for reuse in subsequent reactions, thereby greatly reducing the cost of manufacture of these important cortical hormones.

The process of this invention in addition to providing osmium tetroxide in reusable form is also an effective method for removing osmium from the steroid reaction mixture, thereby preventing contamination of the desired steroid products with highly toxic osmium.

DETAILED DESCRIPTION

The process of this invention is generally applicable to the recovery of osmium tetroxide from a reaction mixture resulting from the oxygenation of $\Delta^{17,20}$-21-acyloxy steroids with osmium tetroxide and an oxidizing agent to obtain the corresponding 17α-hydroxy-20-keto-21-acyloxy steroid. These reactions are well known in the art, for example, see the references cited hereinabove. Thus the process of this invention for the recovery of osmium tetroxide is generally applicable to those oxidations wherein a $\Delta^{17,\,20}$-21-acyloxy steroid is dissolved, dispersed or suspended in a suitable inert organic solvent, such as tertiary butyl alcohol, cyclohexanone, tertiary amyl alcohol and the like and subjected to an oxidizing agent in the presence of osmium tetroxide to obtain the corresponding 17α-hydroxy-20-keto-21-acyloxy steroid. Oxidizing agents which can be used are those disclosed in the prior art such as chloric acid, hydrogen peroxide, alkyl peroxides, peracids, amine oxide peroxides, organic polyvalent iodo oxides, and the like. When hydrogen peroxide, an amine oxide peroxide or a polyvalent iodo oxide is used as the oxidizing agent, it has been found advantageous to carry out the oxidation in the presence of pyridine or a like aromatic tertiary-N-heterocyclic amine as in the cited prior art. The process of this invention is especially advantageous in recovering osmium tetroxide from the oxidation of $\Delta^{17,\,20}$-21-acyloxy steroids which are carried out in tertiary butyl alcohol, using an amine oxide peroxide, preferably N-methylmorpholine oxide peroxide as the oxidizing agent in the presence of pyridine. N-methylmorpholine oxide peroxide and other amine oxide peroxides can be prepared in accordance with the procedures disclosed in U.S. Pat. 2,769,823.

In carrying out the osmium recovery process of the present invention, a reaction mixture resulting from the oxidation of a $\Delta^{17,\,20}$-21-acyloxy steroid to obtain a 17α-hydroxy-20-keto-21-acyloxy steroid, as described above, is treated with an excess of thiourea under aqueous acidic conditions. The osmium present in the reaction mixture is thereby reduced to trivalent osmium by the thiourea forming a water soluble osmium thiourea complex,

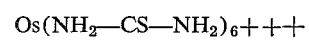

$$\mathrm{Os(NH_2-CS-NH_2)_6{+}{+}{+}}$$

The osmium thiourea reaction is carried out in the presence of an aqueous mineral acid such as hydrochloric, phosphoric, sulfuric and the like, of these an aqueous solution of sulfuric acid is especially advantageous. The reaction is generally carried out within a temperature range of about 60° C. to about 120° C., although higher or lower temperatures can be used, the reaction will proceed at a much slower rate at lower temperatures. Temperatures within the range of about 70–90° C. are preferred. It is generally convenient and advantageous to carry out the reaction under reflux conditions, with a solvent which permits maintenance of the desired temperature range. The time required to complete the reaction can vary from about one-half to two hours. One hour being generally sufficient when the reaction is carried out within the preferred temperature range. Lower temperatures will usually result in longer reaction times, whereas at higher temperatures shorter reaction times will be needed to complete the reaction.

The thiourea complex thus obtained can then be readily separated from the reaction mixture as an aqueous phase when the steroid reaction from which the osmium is to be recovered was carried out in a water immiscible solvent or a miscible solvent from which the aqueous phase readily separates such as tertiary butyl alcohol, tertiary amyl alcohol and the like. If the steroid reaction mixture from which the osmium is to be recovered consists of a water miscible solvent from which the osmium thiourea complex does not readily separate as an aqueous phase, separation of an aqueous phase is brought about by known methods, for example, by the addition of a polar salt such as sodium chloride, sodium sulfate and the like, or by the addition of a sufficient quantity of a water immiscible solvent, such as benzene, toluene, chloroform, hexanes and the like, to cause separation of an aqueous thiourea complex solution from the organic solvent.

The aqueous phase thus obtained is then treated with sufficient hydrogen peroxide to oxidize the osmium thiourea complex to osmium tetroxide. In carrying out the oxidation an excess of hydrogen peroxide is necessary to oxidize the unreacted thiourea remaining in the aqueous solution. Oxidation of the thiourea complex is generally carried out at a temperature within the range of from about 10 to about 40° C. Although higher or lower temperatures can be used, lower temperatures result in longer reaction times, and higher temperatures can result in loss of hydrogen peroxide. A temperature within the range of about 20 to 30° C. is preferred. The time required for completion of the oxidation reaction can vary from a few minutes to several hours depending in part on the temperatures employed and the concentration of reactants. When carried out within the preferred temperature range, 30 to 60 minutes is generally sufficient to convert the osmium thiourea complex to osmium tetroxide.

The osmium tetroxide thus obtained is recovered from the aqueous solution in accordance with methods known in the art, for example, by extraction with a water immiscible solvent in which the osmium tetroxide is soluble, solvents which can be used include, for example, chloroform, benzene, carbon tetrachloride, cyclohexane and the like. Alternatively, the osmium tetroxide can be recovered by distillation under reduced pressure or by steam distillation. Due to simplicity of operation, solvent extraction is generally preferred for the recovery of the osmium tetroxide for use in subsequent reactions. Chloroform is an excellent solvent for the extraction. It does not interfere in subsequent steroid oxidations and it provides a stable and non-flammable medium in which the osmium tetroxide can be stored without appreciable deterioration.

In carrying out the osmium tetroxide extraction, the solvent can be added either prior to or after carrying out the hydrogen peroxide oxidation. It is often convenient and advantageous to add the solvent prior to adding the hydrogen peroxide, thereby extracting the osmium tetroxide into the solvent layer as it is formed.

The following preparation and examples further illustrate the process of this invention but are not to be construed as limiting.

PREPARATION 1

N-methylmorpholine oxide peroxide

To a solution of 132 parts of N-methylmorpholine in 304 parts of tertiary butyl alcohol is added 198 parts of 50% hydrogen peroxide slowly with stirring and while maintaining the temperature between about 30 and 35° C. the N-methylmorpholine oxide peroxide solution thus obtained is then allowed to stand for about 48 hours at room temperature (about 25° C.) before using.

EXAMPLE 1

Hydrocortisone acetate

A solution of 11β-hydroxy-21-acetoxy-4,17(20)-pregnadiene-3-one in 117 ml. of tertiary butyl alcohol is treated with activated charcoal with agitation at 55–60° C. for a period of about 15 minutes. The mixture is then filtered to remove the charcoal and the charcoal filter cake is washed with about 10 ml. of tertiary butyl alcohol. The combined filtrate and wash is then cooled to about 25° C. and treated with 25 mg. of crystalline osmium tetroxide dissolved in tertiary butyl alcohol, 10.1 mls. of pyridine and 60.5 ml. of N-methylmorpholine oxide peroxide (prepared in accordance with Preparation 1, above). This reaction mixture is stirred at 30–35° C. for a period of about 20 hours or until the reaction is complete. This reaction mixture is then treated with 4 g. of thiourea and 75 mls. of 4 N sulfuric acid, refluxed with stirring for about 1 hour (about 80° C.), cooled to 25° C. and the lower aqueous phase is separated from the organic solvent phase. The reaction mixture is then washed twice with a solution of 8 mls. of pyridine dissolved in 25 mls. of 4 N sulfuric acid. The aqueous phase and the aqueous washes are combined and saved for osmium recovery.

The organic solvent phase of the reaction mixture is then treated with 1.4 g. of activated charcoal, stirred for one-half hour at about 35° C., filtered and washed twice with 37.5 ml. of tertiary butyl alcohol. The combined filtrate and wash is then diluted with 216 ml. of deionized water, concentrated to about 337 ml. under reduced pressure and diluted with an additional 167 ml. of deionized water. The mixture is then stirred for about one-half hour at room temperature and an additional 532 ml. of water is added. The mixture is then cooled to about 10° C. with stirring, allowed to stand overnight at about 5° C., filtered and washed with 225 ml. of cold water. The filter cake thus obtained is vacuum dried at about 75–85° C. to give 14.24 g. (65.0% yield) of hydrocortisone acetate, M.P. 214.5–216.5° C.; $[\alpha]_D^{25°} + 153°$.

EXAMPLE 2

Osmium recovery

A 1780 ml. sample from a large scale run of hydrocortisone acetate containing 35.9 mg. of osmium (the large scale run is carried out essentially as described in Example 1, above, prior to treatment with thiourea and sulfuric acid) is treated with 150 ml. of 4 N sulfuric acid and 8 g. of thiourea, heated to reflux (about 80° C.), refluxed for about 1 hour and then cooled to about 25° C. The lower aqueous phase is separated, diluted with 40 ml. of water, and washed with two 50 ml. portions of methylene chloride to remove organic material. The residual methylene chloride in the aqueous phase is flashed off and an additional 5 ml. of sulfuric acid is added. The aqueous phase is then cooled to 25° C. and 50 ml. of chloroform is added with stirring. Stirring and cooling is continued and 5 ml. of 50% hydrogen peroxide is added keeping the temperature between 25–30° C.; when the exothermic reaction subsides cooling is stopped and the mixture is stirred at about 25–30° C. for a total period of about 45 minutes from the addition of the hydrogen peroxide. The reaction mixture is then cooled to about 25° C. and the chloroform is separated from the aqueous phase. The aqueous phase is washed 3 times with 50 ml. of chloroform. Analysis of the original extract and washes showed a total yield of 32.3 g. (90.0% recovery) of osmium tetroxide.

The first extract is used as a source of osmium tetroxide for subsequent steroid oxidations and the chloroform wash extracts are used for the extraction of osmium tetroxide from the recovery step of subsequent steroid oxidations.

EXAMPLE 3

Recovery of osmium tetroxide

A 1612.8 mls. sample containing 32.4 g. of prednisone acetate and an equivalent of 53.8 mg. of osmium tetroxide (the sample was taken from a large scale run wherein 11β-hydroxy-21-acetoxy-1,4,17(20)-pregnadiene - 3 - one was oxidized to prednisolone acetate in the manner disclosed in Example 1, above, prior to the addition of thiourea and sulfuric acid) is treated with 110 ml. of 4 N sulfuric acid and 6.2 g. of thiourea, refluxed for 1 hour at about 80° C., and cooled to 25° C. The aqueous phase thus obtained is separated from the organic phase and the organic phase is saved for the recovery of prednisolone acetate.

The aqueous phase is diluted with 66 ml. of water and extracted with two 42 ml. portions of methylene chloride to remove organic material. The residual methylene chloride remaining in the aqueous phase is removed by vacuum distillation and distillation is continued until essentially all volatile organic material is removed from the system. The aqueous phase is then cooled to about 15° C. and 35 ml. (41.8 g.) of 50% hydrogen peroxide is added slowly with cooling. The osmium tetroxide thus obtained is then removed by vacuum distillation and collected in tertiary butyl alcohol, yield 49.2 mg. (91.2% recovery) of osmium tetroxide.

Alternatively the osmium tetroxide can be recovered from the aqueous phase by extraction with an organic solvent such as chloroform in accordance with the procedure described in Example 2, above.

In the same manner following the procedure of Examples 2 and 3, osmium tetroxide can likewise be recovered from other similar steroid oxidation reaction mixtures. For example, the reaction mixture resulting from the conversion of:

21-acetoxy-4,17(20)-pregnadiene - 3,11-dione to obtain cortisone acetate;
21-acetoxy-1,4,17(20)-pregnatriene - 3,11-dione to obtain prednisone acetate;
6α-methyl-11β-hydroxy-21-acetoxy - 1,4,17(20) - pregnatriene-3-one to obtain 6α-methylprednisolone acetate;
16α-methyl-11β-hydroxy-21-acetoxy - 4,17(20) - pregnadiene - 3 - one to obtain 16α - methylhydrocortisone acetate;
6α-fluoro-11β-hydroxy-21-acetoxy - 1,4,17(20) - pregnadiene-3-one to obtain 6α-fluoroprednisolone acetate and the like.

EXAMPLE 4

Hydrocortisone acetate

In the same manner following the procedure of Example 1, above, but substituting an equivalent amount of recovered osmium tetroxide in chloroform in place of the crystalline osmium tetroxide, there is obtained 14.0 g. (64.5% yield) of hydrocortisone acetate, M.P. 213–218° C.; $[\alpha]_D^{25°}+153°$.

I claim:
1. A process for the recovery of osmium tetroxide from a reaction mixture resulting from the oxidation of a $\Delta^{17,(20)}$-21-acyloxy steroid in an organic solvent with osmium tetroxide and an oxidizing agent to obtain the corresponding 17α-hydroxy - 20-keto-21-acyloxy steroid, which comprises the steps of:
   (1) treating said reaction mixture with thiourea and an aqueous mineral acid to produce an osmium thiourea complex;
   (2) separating the osmium thiourea complex thus obtained from the reaction mixture in an aqueous phase;
   (3) treating said aqueous phase with hydrogen peroxide to oxidize the osmium thiourea complex to osmium tetroxide; and
   (4) recovering the osmium tetroxide from the aqueous phase.
2. The process of claim 1 wherein the mineral acid is sulfuric acid.
3. The process of claim 1 wherein the osmium tetroxide is recovered by extraction with a water immiscible organic solvent.
4. The process of claim 1 wherein the osmium tetroxide is recovered by extraction with chloroform.
5. A process for the recovery of osmium tetroxide from a reaction mixture resulting from the oxidation of a $\Delta^{17(20)}$-21-acyloxy steroid in an organic solvent with osmium tetroxide and an amine oxide peroxide in the presence of an aromatic tertiary-N-heterocyclic amine to obtain the corresponding 17α-hydroxy-20-keto-21-acyloxy steroid, which comprises the steps of:
   (1) treating said reaction mixture with thiourea and an aqueous mineral acid to produce an osmium thiourea complex;
   (2) separating the osmium thiourea complex thus obtained from the reaction mixture in aqueous phase;
   (3) treating said aqueous phase with hydrogen peroxide to oxidize the osmium thiourea complex to osmium tetroxide; and
   (4) recovering the osmium tetroxide from the aqueous phase by extraction with a water immiscible organic solvent.
6. The process of claim 5 wherein the amine oxide peroxide is N-methylmorpholine oxide peroxide and the aromatic tertiary-N-heterocyclic amine is pyridine.
7. The process of claim 5 wherein the osmium tetroxide is extracted with chloroform.
8. A process for the recovery of osmium tetroxide from a reaction mixture resulting from the oxidation of 11β-hydroxy-21-acetoxy-4,17(20)-pregnadiene - 3 - one in tertiary butyl alcohol with osmium tetroxide and N-methylmorpholine oxide peroxide in the presence of pyridine to obtain hydrocortisone acetate, which comprises the steps of:
   (1) treating said reaction mixture with thiourea and aqueous sulfuric acid to obtain an osmium thiourea complex;
   (2) separating the osmium thiourea complex thus obtained from the reaction mixture in an aqueous phase;
   (3) treating said aqueous phase with hydrogen peroxide to oxidize the osmium thiourea complex to osmium tetroxide; and
   (4) recovering the osmium tetroxide from the aqueous phase by extraction with chloroform.
9. The process of claim 8, wherein the osmium tetroxide is recovered from a reaction mixture resulting from the oxidation of 11β-hydroxy - 21 - acetoxy-1,4,17(20)-pregnatriene-3-one to obtain prednisolone acetate.

References Cited

UNITED STATES PATENTS 2,610,907    9/1952    Stein et al. _____ 23—140
2,813,130    11/1957   Keeler et al. _____ 23—140X

OTHER REFERENCES

Gmelin: "Handbuch Der Anorganischen Chemie," System Nr. 66, 1939, page 48.

MILTON WEISSMAN, Primary Examiner

U.S. Cl. X.R.

23—140